US012718663B2

(12) United States Patent
Kearns

(10) Patent No.: US 12,718,663 B2
(45) Date of Patent: Aug. 25, 2026

(54) GAMING MACHINE AND METHOD WITH PERSISTENT CATALYST FEATURE

(71) Applicant: LNW Gaming, Inc., Las Vegas, NV (US)

(72) Inventor: John Kearns, Henderson, VA (US)

(73) Assignee: LNW Gaming, Inc., Las Vegas, NV (US)

( * ) Notice: Subject to any disclaimer, the term of this patent is extended or adjusted under 35 U.S.C. 154(b) by 516 days.

(21) Appl. No.: 17/547,438

(22) Filed: Dec. 10, 2021

(65) Prior Publication Data

US 2023/0186728 A1 Jun. 15, 2023

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3244* (2013.01); *G07F 17/34* (2013.01)

(58) Field of Classification Search
CPC ............. G07F 17/3267; G07F 17/3213; G07F 17/3244; G07F 17/34
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
5,342,047 A 8/1994 Heidel et al.
5,356,140 A 10/1994 Dabrowski et al.
5,393,061 A 2/1995 Manship et al.
5,395,111 A 3/1995 Inoue
5,431,408 A 7/1995 Adams
5,511,781 A 4/1996 Wood et al.
(Continued)

FOREIGN PATENT DOCUMENTS

AU 2001055957 A1 3/2002
AU 2013251288 A1 5/2014
(Continued)

OTHER PUBLICATIONS

Ancient Arcadia game brochure, Copyright 2011 IGT.
(Continued)

*Primary Examiner* — Jeffrey K Wong

(57) ABSTRACT

There is provided a gaming system, gaming machine, and method that utilize an electronic display device configured to display a plurality of reels and an array. The plurality of reels bear a plurality of symbols, including standard symbols, a catalyst symbol, and value-bearing symbols. A series of reel spins are conducted where each spin lands symbols from the plurality of symbols in the array. In response to the catalyst symbol being among the landed symbols in a spin, a payout is awarded based any value-bearing symbols among the landed symbols. For each subsequent spin in the series, the catalyst symbol is shifted to an adjacent position in the array, and a payout is awarded based on any value-bearing symbols among the landed symbols until the catalyst symbol shifts off the array.

15 Claims, 4 Drawing Sheets

(56) References Cited

U.S. PATENT DOCUMENTS

| | | | |
|---|---|---|---|
| 5,618,232 | A | 4/1997 | Martin |
| 5,695,188 | A | 12/1997 | Ishibashi |
| 5,704,835 | A | 1/1998 | Dietz |
| 5,722,891 | A | 3/1998 | Noue |
| 5,752,881 | A | 5/1998 | Inoue |
| 5,766,074 | A | 6/1998 | Cannon et al. |
| 5,788,573 | A | 8/1998 | Baerlocher et al. |
| 5,807,177 | A | 9/1998 | Takemoto et al. |
| 5,810,665 | A | 9/1998 | Takemoto et al. |
| 5,833,537 | A | 11/1998 | Barrie |
| 5,848,932 | A | 12/1998 | Adams |
| 5,855,515 | A | 1/1999 | Pease et al. |
| 5,876,284 | A | 3/1999 | Acres et al. |
| 5,882,259 | A | 3/1999 | Holmes et al. |
| 5,882,261 | A | 3/1999 | Adams |
| 5,890,962 | A | 4/1999 | Takemoto |
| 5,911,418 | A | 6/1999 | Adams |
| 5,947,820 | A | 9/1999 | Morro et al. |
| 5,951,397 | A | 9/1999 | Dickinson |
| 5,988,638 | A | 11/1999 | Rodesch et al. |
| 6,004,207 | A | 12/1999 | Wilson et al. |
| 6,027,115 | A | 2/2000 | Griswold et al. |
| 6,033,307 | A | 3/2000 | Vancura |
| 6,048,269 | A | 4/2000 | Burns et al. |
| 6,050,895 | A | 4/2000 | Luciano et al. |
| 6,056,642 | A | 5/2000 | Bennett |
| 6,089,976 | A | 7/2000 | Schneider et al. |
| 6,089,977 | A | 7/2000 | Bennett |
| 6,102,798 | A | 8/2000 | Bennett |
| 6,120,031 | A | 9/2000 | Adams |
| 6,142,873 | A | 11/2000 | Weiss et al. |
| 6,159,097 | A | 12/2000 | Gura |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,203,429 | B1 | 3/2001 | Demar et al. |
| 6,213,875 | B1 | 4/2001 | Suzuki |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,309,300 | B1 | 10/2001 | Glavich |
| 6,319,124 | B1 | 11/2001 | Baerlocher et al. |
| 6,375,567 | B1 | 4/2002 | Acres |
| 6,375,570 | B1 | 4/2002 | Poole |
| 6,413,162 | B1 | 7/2002 | Baerlocher et al. |
| 6,481,713 | B2 | 11/2002 | Perrie et al. |
| 6,517,432 | B1 | 2/2003 | Jaffe |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,704 | B2 | 4/2003 | Nicastro et al. |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,434 | B1 | 5/2003 | Acres |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,657,923 | B2 | 12/2003 | Laughlin |
| 6,692,356 | B2 | 2/2004 | Baerlocher et al. |
| 6,702,675 | B2 | 3/2004 | Poole et al. |
| 6,731,313 | B1 | 5/2004 | Kaminkow |
| 6,786,818 | B1 | 9/2004 | Rothschild et al. |
| 6,832,957 | B2 | 12/2004 | Falconer |
| 6,837,790 | B1 | 1/2005 | Kaminkow |
| 6,869,360 | B2 | 3/2005 | Marks et al. |
| 6,896,617 | B2 | 5/2005 | Daly |
| 6,910,962 | B2 | 6/2005 | Marks et al. |
| 6,916,243 | B2 | 7/2005 | Yoshida |
| 6,918,834 | B2 | 7/2005 | Vancura |
| 6,926,609 | B2 | 8/2005 | Martin |
| 6,960,134 | B2 | 11/2005 | Hartl et al. |
| 7,018,293 | B2 | 3/2006 | Brown et al. |
| 7,029,395 | B1 | 4/2006 | Baerlocher |
| 7,029,396 | B2 | 4/2006 | Jaffe et al. |
| 7,121,945 | B2 | 10/2006 | Suganuma et al. |
| 7,147,559 | B2 | 12/2006 | Englman |
| 7,156,740 | B2 | 1/2007 | Kaminkow |
| 7,179,169 | B2 | 2/2007 | Beaulieu et al. |
| 7,252,591 | B2 | 8/2007 | Van Asdale |
| 7,316,613 | B2 | 1/2008 | Luccesi et al. |
| 7,371,170 | B2 | 5/2008 | Cregan et al. |
| 7,377,850 | B2 | 5/2008 | Shackelford et al. |
| 7,431,646 | B2 | 10/2008 | Jackson |
| 7,452,276 | B2 | 11/2008 | Loose et al. |
| 7,458,890 | B2 | 12/2008 | Loose et al. |
| 7,488,252 | B2 | 2/2009 | Griswold et al. |
| 7,503,847 | B2 | 3/2009 | Baerlocher |
| 7,526,736 | B2 | 4/2009 | Kaminkow et al. |
| 7,553,231 | B2 | 6/2009 | Rodgers et al. |
| 7,578,735 | B2 | 8/2009 | Frizzell et al. |
| 7,601,062 | B2 | 10/2009 | Cole et al. |
| 7,604,538 | B2 | 10/2009 | Pacey |
| 7,618,319 | B2 | 11/2009 | Casey et al. |
| 7,625,278 | B2 | 12/2009 | Paulsen et al. |
| 7,654,895 | B2 | 2/2010 | Pacey |
| 7,654,899 | B2 | 2/2010 | Durham et al. |
| 7,699,699 | B2 | 4/2010 | Gilliland et al. |
| 7,704,141 | B1 | 4/2010 | Marks et al. |
| 7,744,460 | B2 | 6/2010 | Walker et al. |
| 7,785,191 | B2 | 8/2010 | Marks et al. |
| 7,789,744 | B2 | 9/2010 | Fiden |
| 7,841,934 | B2 | 11/2010 | Gauselmann |
| 7,980,936 | B2 | 7/2011 | Mead |
| 8,021,223 | B2 | 9/2011 | Rose |
| 8,021,225 | B2 | 9/2011 | Okada |
| 8,066,563 | B1 | 11/2011 | Schultz et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,113,940 | B2 | 2/2012 | Hornik |
| 8,147,322 | B2 | 4/2012 | Walker et al. |
| 8,162,740 | B2 | 4/2012 | Aoki |
| 8,162,741 | B2 | 4/2012 | Wadleigh et al. |
| 8,192,275 | B2 | 6/2012 | Aoki et al. |
| 8,246,442 | B1 | 8/2012 | Barrie |
| 8,272,938 | B2 | 9/2012 | Gilmore et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,388,432 | B2 | 3/2013 | Mattice et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,121 | B2 | 8/2013 | Macvittie et al. |
| 8,512,124 | B2 | 8/2013 | Bramble et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,602,868 | B2 | 12/2013 | Johnson et al. |
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |
| 8,771,054 | B2 | 7/2014 | Aoki et al. |
| 8,790,169 | B2 | 7/2014 | Saunders |
| 8,795,059 | B2 | 8/2014 | Aoki et al. |
| 8,821,254 | B2 | 9/2014 | Tsukahara |
| 8,834,258 | B2 | 9/2014 | Gobe et al. |
| 8,851,974 | B2 | 10/2014 | Caputo et al. |
| 8,870,642 | B2 | 10/2014 | Leupp et al. |
| 8,882,578 | B2 | 11/2014 | Saunders |

(56) References Cited

U.S. PATENT DOCUMENTS 8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 10/2015 Caputo
9,177,447 B2 11/2015 Zoltewicz et al.
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,595,157 B2 3/2017 Rasmussen et al.
9,633,506 B2 4/2017 Basallo et al.
9,704,342 B2 7/2017 Aoki et al.
9,928,691 B2 3/2018 Olive
10,013,855 B2 7/2018 Nakamura
10,037,651 B2 7/2018 You et al.
10,043,350 B2 8/2018 Gomez et al.
10,062,237 B2 8/2018 Devine et al.
10,204,473 B2 2/2019 Lenger
10,242,533 B2 3/2019 Okada et al.
10,339,761 B2 7/2019 Olive
10,366,575 B2 7/2019 Visser
10,388,112 B2 8/2019 You et al.
10,410,472 B2 9/2019 Moody
10,417,877 B2 9/2019 Gomez et al.
10,475,294 B2 11/2019 Gomez et al.
10,497,203 B2 12/2019 Elmqvist
10,672,220 B2 6/2020 Lenger
10,706,664 B2 7/2020 Boese et al.
10,726,676 B2 7/2020 You et al.
10,726,678 B1* 7/2020 Rehill .................. G07F 17/326
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0021666 A1 9/2001 Yoshida et al.
2001/0031659 A1* 10/2001 Perrie ................ A63F 3/00643 463/18
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2003/0216165 A1 11/2003 Singer et al.
2004/0012145 A1 1/2004 Inoue
2004/0023714 A1 2/2004 Asdale
2004/0043815 A1 3/2004 Kaminkow
2004/0048646 A1 3/2004 Visocnik
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0014559 A1* 1/2005 Mattice ............... G07F 17/3241 463/29
2005/0035550 A1* 2/2005 Jackson .............. G07F 17/3297 273/292
2005/0054442 A1 3/2005 Anderson et al.
2005/0130731 A1 6/2005 Englman et al.
2005/0159208 A1 7/2005 Pacey
2005/0239538 A1* 10/2005 Dixon ..................... G07F 17/34 463/20
2006/0009286 A1 1/2006 Durham et al.
2006/0063588 A1 3/2006 Poole
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0099695 A1* 5/2007 Wilson .................... G07F 17/34 463/25
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0039190 A1* 2/2008 Walker .................... G07F 17/32 463/25
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0146346 A1* 6/2008 Hardy ................... G07F 17/329 463/16
2008/0182647 A1 7/2008 Brunet De Courssou et al.
2008/0274789 A1 11/2008 Singer et al.
2009/0036208 A1 2/2009 Pennington et al.
2009/0156287 A1 6/2009 Baumgartner
2009/0181755 A1 7/2009 Gagner et al.
2009/0239634 A1 9/2009 Nguyen
2009/0291741 A1 11/2009 Schofield
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0045906 A1* 2/2011 Berman .............. G07F 17/3202 463/43
2011/0244943 A1 10/2011 Milford et al.
2011/0300937 A1 12/2011 Crowder, Jr. et al.
2012/0015707 A1 1/2012 Hornik et al.
2012/0034965 A1 2/2012 Masen et al.
2012/0077564 A1 3/2012 Collette et al.
2012/0094738 A1 4/2012 Aoki et al.
2012/0122532 A1 5/2012 Berman et al.
2012/0178517 A1 7/2012 Montenegro et al.
2012/0220360 A1 8/2012 Kelly et al.
2013/0053124 A1 2/2013 Masen et al.
2013/0065663 A1 3/2013 Johnson et al.
2013/0102375 A1 4/2013 Aoki et al.
2013/0157751 A1* 6/2013 Loose ................ G07F 17/3211 463/25
2013/0252704 A1 9/2013 Gilbertson et al.
2013/0260861 A1 10/2013 Vann et al.
2013/0324217 A1 12/2013 Gilbertson et al.
2014/0014186 A1 1/2014 Bhattacharya et al.
2014/0024429 A1 1/2014 Aoki et al.
2014/0051496 A1 2/2014 Meyer

(56) References Cited

U.S. PATENT DOCUMENTS

| | | | | |
|---|---|---|---|---|
| 2014/0087868 | A1* | 3/2014 | Rosander | G07F 17/3216 463/31 |
| 2014/0094274 | A1* | 4/2014 | Guinn | G07F 17/3244 463/25 |
| 2014/0141860 | A1 | 5/2014 | Meyer | |
| 2014/0179396 | A1 | 6/2014 | Aoki et al. | |
| 2014/0274292 | A1 | 9/2014 | Suda | |
| 2014/0323198 | A1 | 10/2014 | Tuck | |
| 2015/0031437 | A1 | 1/2015 | Gomez et al. | |
| 2015/0072770 | A1* | 3/2015 | Simongini | G07F 17/3244 463/25 |
| 2015/0170462 | A1 | 6/2015 | Berman et al. | |
| 2015/0206386 | A1 | 7/2015 | Jaffe et al. | |
| 2015/0269809 | A1 | 9/2015 | Smith | |
| 2015/0287269 | A1 | 10/2015 | Berman | |
| 2015/0356833 | A1 | 12/2015 | Aoki et al. | |
| 2015/0379831 | A1 | 12/2015 | Lee et al. | |
| 2016/0042597 | A1 | 2/2016 | Olive | |
| 2016/0063799 | A1* | 3/2016 | Reeves | G07F 17/326 463/17 |
| 2016/0155303 | A1 | 6/2016 | Aoki et al. | |
| 2017/0154498 | A1 | 6/2017 | Olive | |
| 2017/0372558 | A1 | 12/2017 | You et al. | |
| 2018/0130303 | A1 | 5/2018 | Lamb | |
| 2018/0268655 | A1 | 9/2018 | Olive | |
| 2018/0268659 | A1 | 9/2018 | Chesworth et al. | |
| 2019/0102992 | A1 | 4/2019 | You et al. | |
| 2019/0236905 | A1 | 8/2019 | Washington et al. | |
| 2021/0217272 | A1* | 7/2021 | Sanborn | G07F 17/34 |
| 2021/0233360 | A1* | 7/2021 | Hiten | G07F 17/3213 |

FOREIGN PATENT DOCUMENTS

| | | | |
|---|---|---|---|
| AU | 2014202042 | A1 | 5/2014 |
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
Product Sheet for “Vikings Creed,” Released Oct. 2020, Slotmill Limited.
“Jack and the Beanstalk” Game Sheet, Copyright 2017 NetEnt Product Services Ltd.

* cited by examiner

GAMING MACHINE AND METHOD WITH PERSISTENT CATALYST FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021, SG Gaming, Inc.

FIELD OF THE INVENTION

The present invention relates to a technological improvement to gaming systems, gaming machines, and methods and, more particularly, to new and improved animations in connection with a persistent catalyst feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize an electronic display device configured to display a plurality of reels and an array. The plurality of reels bear a plurality of symbols, including standard symbols, a catalyst symbol, and value-bearing symbols. A series of reel spins are conducted where each spin lands symbols from the plurality of symbols in the array. In response to the catalyst symbol being among the landed symbols in a spin, a payout is awarded based any value-bearing symbols among the landed symbols. For each subsequent spin in the series, the catalyst symbol is shifted to an adjacent position in the array, and a payout is awarded based on any value-bearing symbols among the landed symbols until the catalyst symbol shifts off the array.

Additional aspects of the invention will be apparent to those of ordinary skill in the art in view of the detailed description of various embodiments, which is made with reference to the drawings, a brief description of which is provided below.

Figure 1:
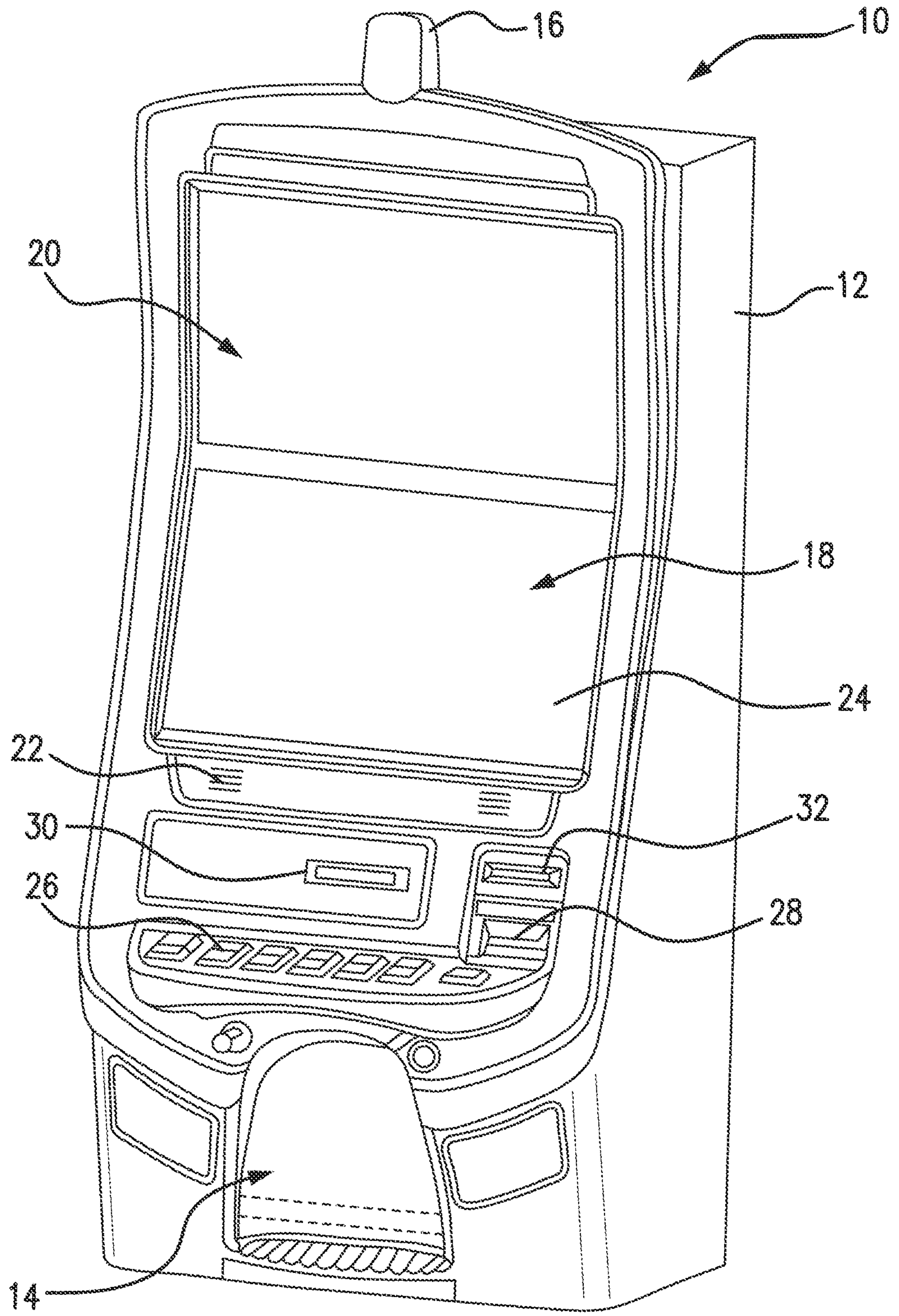
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive, the word "all" means "any and all"; the word "any" means "any and all"; and the word "including" means "including without limitation."

For purposes of the present detailed description, the terms "wagering game," "casino wagering game," "gambling,"

"slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-7). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-7), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
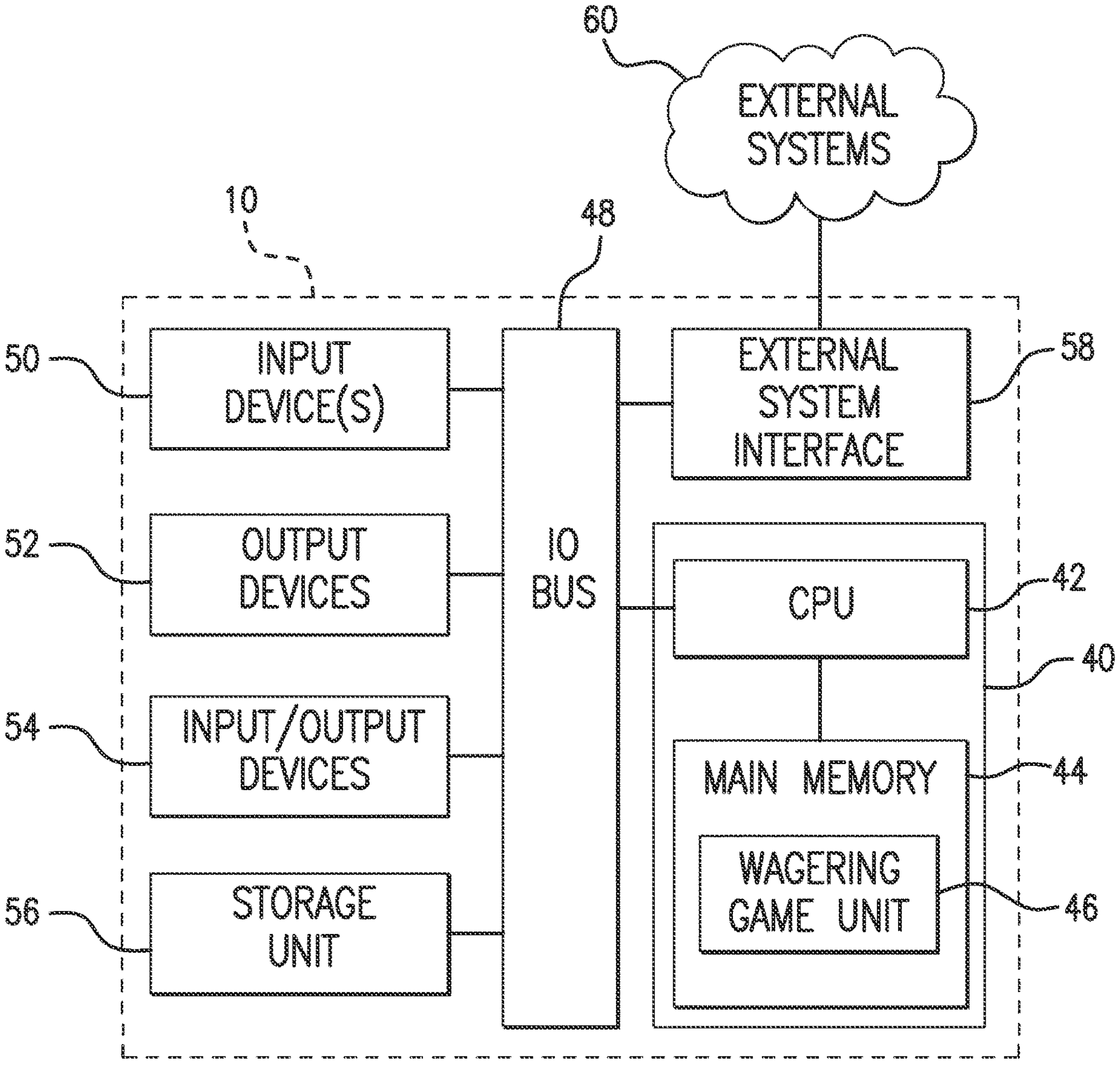
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 3:
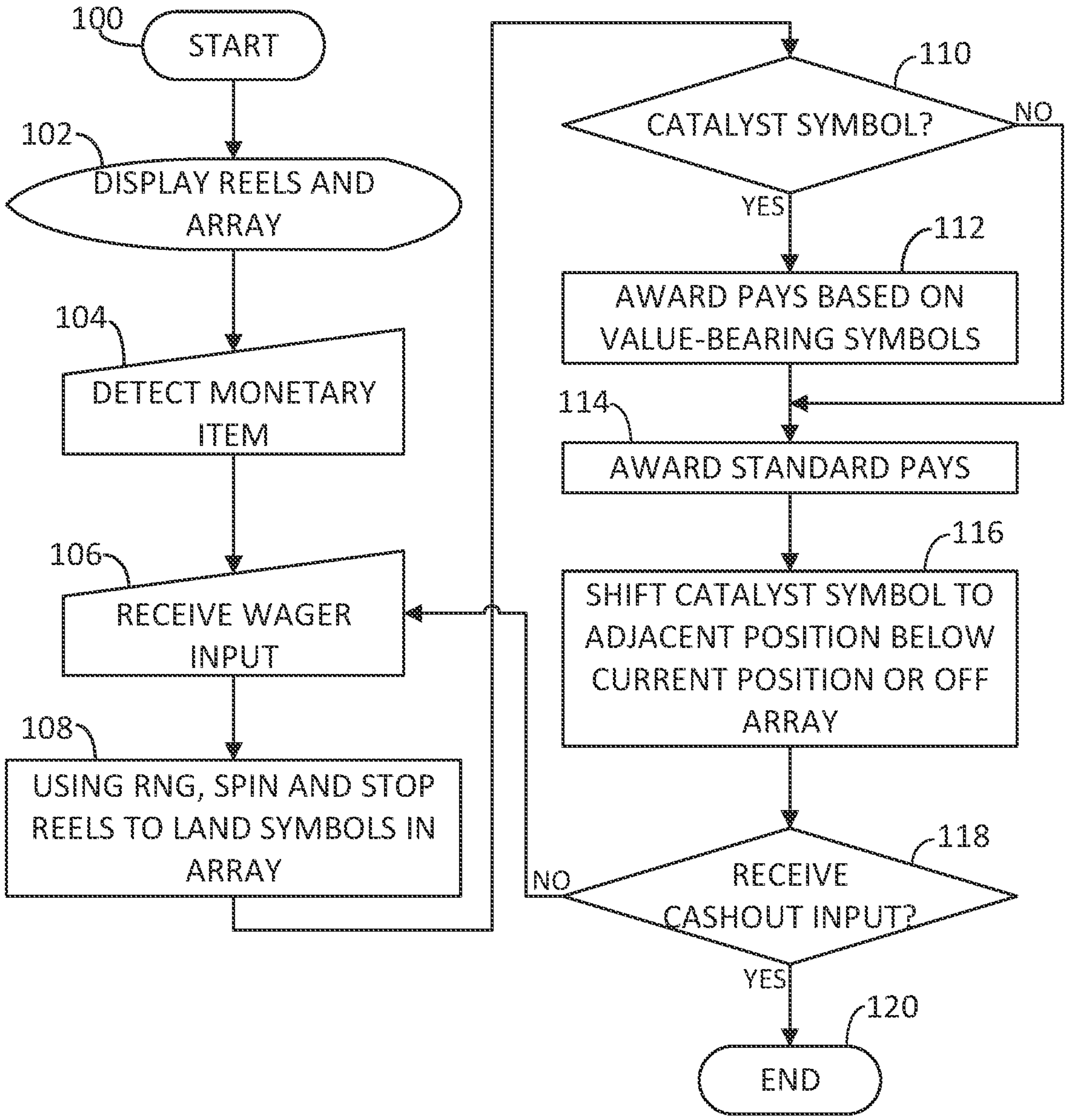
FIG. 3 is a flowchart for a data processing method that corresponds to instructions executed by a controller, according to an embodiment of the present invention.

Referring now to FIG. 3, there is shown a flowchart representing one data processing method corresponding to at least some instructions stored and executed by the game-logic circuitry 40 in FIG. 2 to perform operations according to an embodiment of the present invention. The data processing method is described below in connection with an exemplary representation of a series of game cycle outcomes (i.e., spin outcomes) in FIGS. 4-8.

The data processing method commences at step 100. At step 102, the game-logic circuitry directs an electronic display device (e.g., video display) of the gaming machine to display a plurality of symbol-bearing reels and an array of symbol positions. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

In the example shown in FIGS. 4-8, the electronic display device displays a three-by-five array 230 comprising three rows 220, 222, 224 and five columns 210, 212, 214, 216, 218. Each column is associated with a respective reel such that the reel populates the three symbol positions in the associated column. The reels bear a plurality of symbols. In one embodiment, the plurality of symbols include standard symbols A, B, C, D, E, and F, value-bearing symbols V, and a catalyst symbol (e.g., a four-pointed star). Each value-bearing symbol V is associated with a credit or currency value indicated on the symbol itself. The value on a particular symbol V may be fixed or variable (e.g., random) from one game cycle to the next. Different value-bearing symbols V on the reels may have different values. Each reel may contain one or more stacks (i.e., clumps) of value-bearing symbols V that appear adjacent to each other along the reel. The values of the value-bearing symbols V in any given stack may be the same or different. A stack of value-bearing symbols V may consist of two, three, four, or more adjacent symbols V. The value-bearing symbols may appear only on the middle three reels associated with the columns 212, 214, and 216. The catalyst symbol may appear only on the leftmost and rightmost reels associated with the columns 210 and 218.

Returning to FIG. 3, at step 104, the game-logic circuitry detects, via a value input device, a physical item associated with a monetary value that establishes a credit balance. As shown in FIGS. 4-8, the credit balance may be shown on a credit meter 200 of the gaming machine.

At step 106, the game-logic circuitry initiates a wagering game cycle in response to an input indicative of a wager covered by the credit balance. To initiate a spin of the reels, the player may press a "Spin" or "Max Bet" key on a button panel or touch screen. As shown in FIGS. 4-8, the wager may be shown on a bet meter 202.

At step 108, using an RNG, the game-logic circuitry spins and stops the reels to randomly land symbols from the reels in the array in visual association with one or more paylines (also known as lines, ways, patterns, or arrangements). The reel spin is animated by depicting symbol-bearing strips moving vertically across the display and synchronously updating the symbols visible on each strip as the strip moves across the display.

At step 110, the game-logic circuitry determines whether or not the array contains a catalyst symbol that either landed in the array in the current game cycle or was carried over from the prior game cycle as described below. If the array does not contain a catalyst symbol, the game-logic circuitry immediately proceeds to step 114. If, however, the array contains a catalyst symbol, the game-logic circuitry proceeds to step 112 where it awards pays based on any value-bearing symbols V in the array. To animate a value-bearing symbol pay, the display may apply a border, pattern, color change, background change, watermark, or other distinguishing characteristic to the value-bearing symbols. By way of example, if the spin generates the array of symbols shown in FIG. 4 (which includes the catalyst symbol, e.g., four-pointed star, in column 210), the game-logic circuitry would award the sum of the values on the three value-bearing symbols V in columns 212, 214, and 216. The awarded pays are added to a win meter 204. The game-logic circuitry then proceeds to step 114.

Figure 5:
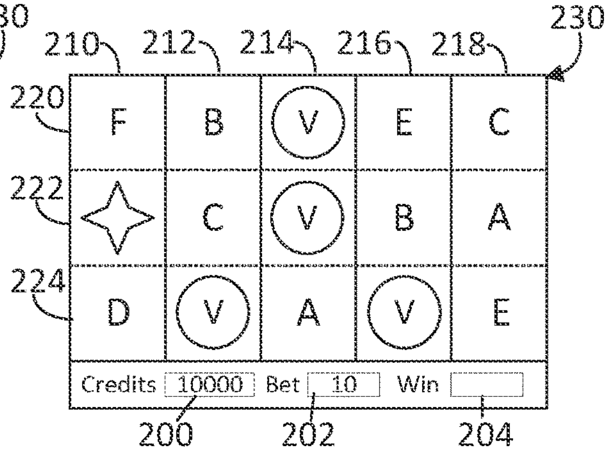
Figure 6:
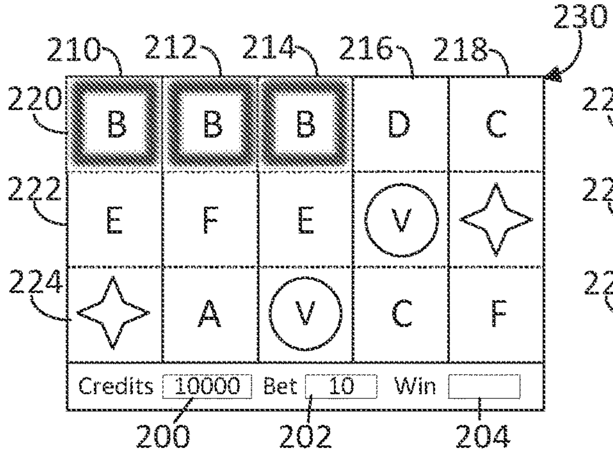

At step 114, the game-logic circuitry awards standard pays in accordance with a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. In the example shown in FIGS. 4-8, standard pays are limited to line pays along three horizontal paylines starting from the leftmost reel: a first payline spanning the middle row 222 of the array 230, a second payline spanning the top row 220 of the array 230, and a third payline spanning the bottom row 224 of the array 230. FIG. 6, for example, depicts a line pay of three B symbols along the top row 220 of the array 230. The awarded pays are added to the win meter 204.

Figure 4:
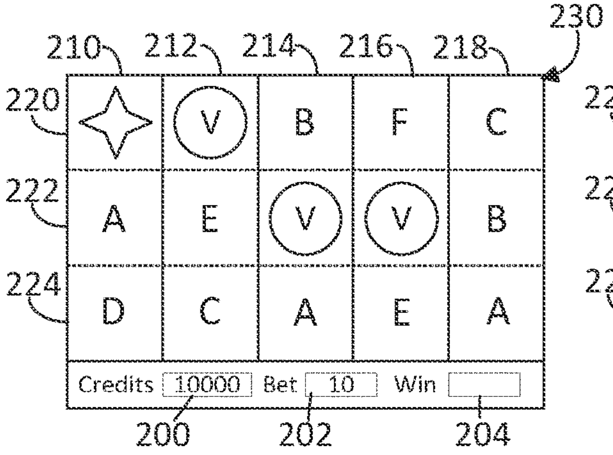
FIGS. 4-8 is an exemplary representation of a series of game cycle outcomes (i.e., spin outcomes) according to an embodiment of the present invention.
Figure 7:
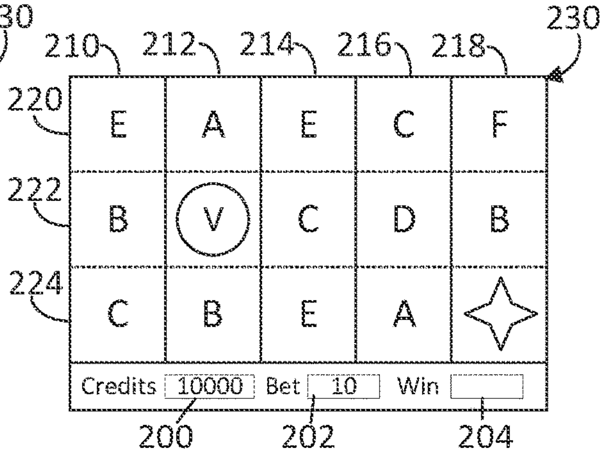

At step 116, the game-logic circuitry shifts any catalyst symbols in the array downward by one symbol position, from its current position in a column to an adjacent position in the same column. The shifted catalyst symbol is held or locked in place in its new position for the next game cycle should the player elect to place another wager at step 106. If the catalyst symbol was disposed in the bottom position of a column prior to being shifted, the catalyst symbol is shifted off the array and removed from the screen. The shifting action may be shown with an animation, such as sliding, rolling, bouncing, rotating, or some combination thereof. As shown in FIGS. 4 and 5, the catalyst symbol (four-pointed star) has shifted from the top position to the middle position in column 210. And as shown in FIGS. 6 and 7, the catalyst symbol (four-pointed star) has shifted from the bottom position in column 210 to off the array 230 and removed from the screen.

At step 118, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the credit balance on the credit meter such as the meter 200 in FIGS. 4-8. The data processing method then ends at step 120.

As described above, if the player places another wager at step 106 to initiate the next game cycle, the shifted catalyst symbol from the prior game cycle is held or locked in place in its new position for the next game cycle. The locked catalyst symbol is held in place as the reels are spun and stopped at step 108 of the next game cycle. The catalyst symbol may be superimposed over the spun reels such that the reels appear to spin behind the catalyst symbol. The superimposed catalyst symbol may completely block the underlying portion of the reels when the reels are spinning and/or when the reels have stopped such that whatever symbol lands in the same position as the catalyst symbol is not visible to the player. Until the catalyst symbol shifts off the array at step 116 of a game cycle, the catalyst symbol serves to award pays at step 112 of the next game cycle based on any value-bearing symbols V in the array. Even as one catalyst symbol may shift off the array at step 116 of a game cycle, a new catalyst symbol may land in the array at step 108 of the next game cycle to award value-bearing symbol pays at step 112 of the next game cycle. And one catalyst symbol may still be on the array after step 116 of a game cycle (and thereby carry over to the next game cycle) while a new catalyst symbol lands in the array at step 108 of the next game cycle. In this case, each catalyst symbol serves to award value-bearing symbol pays at step 112 of the next game cycle such that the pays are awarded twice, i.e., doubled.

Although the data processing method in FIG. 3 depicts each game cycle outcome as being part of a wagered base game, with a wager input (step 106) preceding each outcome, the method may be modified to have a base game and a bonus game triggered during play of the underlying base game. The bonus game may be a series of free spins utilizing steps 102 and 108 through 116 of the method in FIG. 3. The number of free spins may be fixed or variable. For example, when the bonus game commences, a spin counter may be initialized to a reset value, such as five. The spin counter decrements after each free spin but may be reset whenever a value-bearing symbol lands in the array. The series of free spins would continue until the spin counter reaches zero, at which point the bonus game would end and the method would return to the base game.

Although the data processing method in FIG. 3 depicts that a catalyst symbol in the array is shifted at the end of a game cycle at step 116, this shifting step may instead be performed at the beginning of the next game cycle just after the game receives a wager input at step 106.

FIGS. 4-8 depict an exemplary representation of a series of wagering game cycle outcomes (i.e., spin outcomes). Each figure represents a different outcome in the series following the performance of steps 106 through 114 in FIG. 3, but prior to step 116, which is reflected in the next figure in the sequence. In the description of each of FIGS. 4-8 below, reference is made to certain applicable steps from FIG. 3.

Referring to FIG. 4:

- A catalyst symbol (four-pointed star) landed in the top position of column 210 (step 108).
- Three value-bearing symbols V landed in columns 212, 214, and 216 (step 108).
- Because of the catalyst symbol in column 210 (step 110), the sum of the values on the three value-bearing symbols V in columns 212, 214, and 216 is awarded (step 112).
- No standard pays in the array 230 (step 114).
- The catalyst symbol is shifted downward from the top position (FIG. 4) to the middle position (FIG. 5) in column 210 (step 116).

Referring to FIG. 5:

- The shifted catalyst symbol (four-pointed star) is now in the middle position of column 210 (after step 116 of the prior game cycle).
- Four value-bearing symbols V landed in columns 212, 214, and 216 (step 108).
- Because of the catalyst symbol in column 210 (step 110), the sum of the values on the four value-bearing symbols V in columns 212, 214, and 216 is awarded (step 112).
- No standard pays in the array 230 (step 114).
- The catalyst symbol is shifted downward from the middle position (FIG. 5) to the bottom position (FIG. 6) in column 210 (step 116).

Referring to FIG. 6:

- The shifted catalyst symbol (four-pointed star) is now in the bottom position of column 210 (after step 116 of the prior game cycle).
- A new catalyst symbol (four-pointed star) landed in the middle position of column 218 (step 108).
- Two value-bearing symbols V landed in columns 214 and 216 (step 108).
- Because of the two catalyst symbols (an existing shifted one from the prior game cycle and a new one from the current game cycle) in columns 210 and 218 (step 110), the sum of the values on the two value-bearing symbols V in columns 214 and 216 is awarded twice (step 112). For example, if the two symbols V have values of 50 and 100 credits, respectively, the player is awarded 2×(50+100)=300 credits.
- A standard pay of three B symbols along the top row 220 of the array 230 (step 114).
- The catalyst symbol in the bottom position of column 210 (FIG. 6) is shifted off the array (FIG. 7), while the catalyst symbol in column 218 is shifted downward from the middle position (FIG. 6) to the bottom position (FIG. 7) (step 116).

Referring to FIG. 7:

- The shifted catalyst symbol (four-pointed star) in column 218 is now in the bottom position of that column (after step 116 of the prior game cycle).
- One value-bearing symbol V landed in column 212 (step 108).
- Because of the catalyst symbol in column 218 (step 110), the value on the value-bearing symbol V in column 212 is awarded (step 112).
- No standard pays in the array 230 (step 114).
- The catalyst symbol in the bottom position of column 218 (FIG. 7) is shifted off the array (FIG. 8) (step 116).

Figure 8:
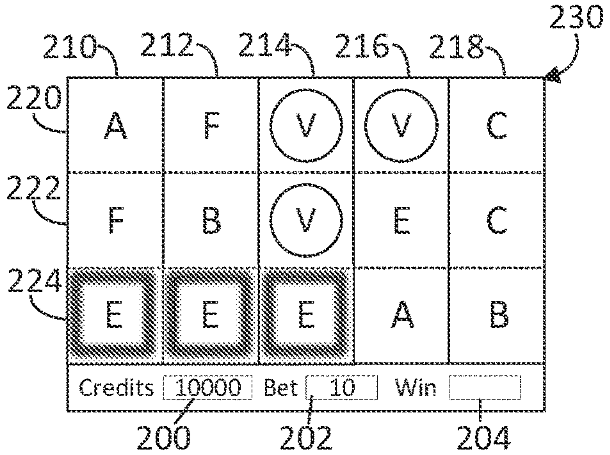

Referring to FIG. 8:

- No catalyst symbols landed in the array in the current game cycle (step 108) or remain in the array from the prior game cycle (after step 116 of the prior game cycle).
- Three value-bearing symbols V landed in columns 214 and 216 (step 108).
- Because the array 230 contains no catalyst symbols (step 110), the sum of the values on the three value-bearing symbol V in columns 214 and 216 is not awarded (skip step 112).
- A standard pay of three E symbols along the bottom row 224 of the array 230 (step 114).

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine comprising:

- executing by one or more processors of a gaming machine, an authentication program stored in a memory to establish an authenticated environment for executing a game;
- presenting, by a presentation assembly, a plurality of reels and a symbol array comprising a plurality of symbol positions;
- initializing, by the one or more processors, stored state information in the memory by storing a first position identifier corresponding to a first position of the symbol array for a catalyst symbol;
- initiating a game cycle in response to a game initiation input received via a player input device;
- determining an outcome of the game cycle, the outcome comprising the catalyst symbol;
- displaying the catalyst symbol at the first position based on the first position identifier stored in the stored state information, wherein displaying the catalyst symbol comprises displaying the catalyst symbol as an overlay superimposed over the plurality of reels such that the reels appear to spin behind the catalyst symbol, and wherein the catalyst symbol blocks at least one symbol position of the plurality of reels;
- maintaining the catalyst symbol on the symbol array for one or more additional game cycles by maintaining the first position identifier in the stored state information across the one or more additional game cycles;
- detecting a trigger event during the one or more additional game cycles; and
- shifting the catalyst symbol from the first position to a second position on the symbol array in response to the trigger event by updating the stored state information to store a second position identifier corresponding to the second position.

2. The method of claim 1, wherein the catalyst symbol appears only on a leftmost one and a rightmost one of the plurality of reels.

3. The method of claim 1, wherein the second position is adjacent to the first position.

4. The method of claim 3, wherein the array includes a plurality of columns, and wherein the first and second positions are in a same one of the columns.

5. The method of claim 1, wherein the shifting operation further comprises shifting the catalyst symbol from the second position to a third position adjacent to the second position on the symbol array in response to a second trigger event during the one or more additional game cycles by updating the stored state information to store a third position identifier corresponding to the third position.

6. The method of claim 5, wherein the array includes a plurality of columns, and wherein the first, second, and third positions are adjacent to each other in a same one of the columns.

7. A method of operating a gaming machine, the gaming machine including a gaming cabinet, a presentation assembly, and game-logic circuitry secured within a locked box inside the gaming cabinet, the game-logic circuitry including a processor and memory storing programming for a continuously cycling random number generator (RNG) and a game, the method comprising:

prior to executing the game, executing an authentication program on the gaming machine to authenticate the programming and establish an authenticated environment for executing the game;

presenting, by the presentation assembly, a plurality of reels and a symbol array comprising a plurality of symbol positions;

initializing stored state information in the memory by storing a first position identifier corresponding to a first position of the symbol array for a catalyst symbol;

initiating a game cycle response to a game initiation input received via a player input device;

determining, using the RNG, an outcome of the e cycle, the outcome comprising the catalyst symbol;

displaying the catalyst symbol at the first position based on the first position identifier stored in the stored state information, wherein displaying the catalyst symbol comprises displaying the catalyst symbol as an overlay superimposed over the plurality of reels such that the reels appear to spin behind the catalyst symbol, and wherein the catalyst symbol blocks at least one symbol position of the plurality of reels;

maintaining the catalyst symbol on the symbol array for one or more additional game cycles by maintaining the first position identifier in the stored state information across the one or more additional game cycles;

detecting a trigger event during the one or more additional game cycles; and shifting the catalyst symbol from the first position to a second position adjacent to the first position on the symbol array in response to the trigger event by updating the stored state information to store a second position identifier corresponding to the second position.

8. The method of claim 7, wherein the catalyst symbol appears only on a leftmost one and a rightmost one of the plurality of reels.

9. The method of claim 7, wherein the array includes a plurality of columns, and wherein the adjacent position is in a same one of the columns.

10. A method of operating a gaming machine, the gaming machine including a gaming cabinet and game-logic circuitry secured within a locked box inside the gaming cabinet, the game logic circuitry including memory storing programming for a continuously cycling random number generator (RNG) and a game, the method comprising the operations of:

prior to executing the game, executing a m on the gaming machine to authenticate the programming;

displaying, on an electronic display device, a plurality of reels and an array, the plurality of reels bearing a plurality of symbols, the plurality of symbols including a catalyst symbol and value-bearing symbols;

conducting, by the game logic circuitry operating in an authenticated state, a series of spins of the plurality of reels, each spin including using the RNG to randomly determine an outcome of the spin and further including:

transforming, by the game-logic circuitry, the randomly-determined outcome into a first defined set of animation control signals configured for the electronic display device;

transmitting the first defined set of animation control signals to the electronic display device to cause the electronic display device to animate spinning and stopping the plurality of reels to land symbols from the reels in the array in accordance with the randomly-determined outcome; and in response to the catalyst symbol being among the landed symbols in a spin in the series and while operating in the authenticated state;

storing, in the memory, stored state information that includes a first position identifier corresponding to a first position of the array for the catalyst symbol;

presenting, on the electronic display device, a first composite value based on one or more of any of the value-bearing symbols among the landed symbols;

for a next spin in the series, determining, by the game-logic circuitry based on the stored state information, an adjacent position for the catalyst symbol;

updating the stored state information to store a second position identifier corresponding to the adjacent position;

transforming, by the game-logic circuitry, the adjacent position into a second defined set of animation control signals configured for the electronic display device; and transmitting the second defined set of animation control signals to the electronic display device to cause the electronic display device to animate shifting the catalyst symbol to the adjacent position in the array;

resenting, on the electronic display device, a second composite value based on one or more of any of the value-bearing symbols among the landed symbols in the next spin in the series; and repeating the shifting and presenting operations until the catalyst symbol shifts off the array, wherein in response to the array including a plurality of the catalyst symbol, at least one of the first composite value and the second composite value is enhanced.

11. The method of claim 10, wherein the catalyst symbol appears only on a leftmost one and a rightmost one of the plurality of reels.

12. The method of claim 10, wherein the array includes a plurality of columns, and wherein the adjacent position is in a same one of the columns.

13. A gaming system comprising:

a gaming machine, the gaming machine comprising:

a display device configured to display a plurality of reels and a symbol array comprising a plurality of symbol positions, each reel comprising a plurality of the symbol positions;

a player input device;

a memory; and a processor, wherein the memory and the processor are configured to:

execute an authentication program to verify integrity of the game programming and establish an authenticated environment for executing the game;

initiate a game cycle in response to a game initiation input received via the player input device;

determine an outcome for the game cycle, the outcome comprising a catalyst symbol;

initialize stored state information in the memory by storing a first position identifier corresponding to a first position of the symbol array for the catalyst symbol;

display the catalyst symbol at the first position based on the first position identifier stored in the stored state information, wherein displaying the catalyst symbol comprises displaying the catalyst symbol as an overlay superimposed over the plurality of reels such that the reels appear to spin behind the catalyst symbol, and wherein the catalyst symbol blocks at least one symbol position of the plurality of reels;

maintain the catalyst symbol on the symbol array for one or more additional game cycles by maintaining the first position identifier in the stored state information across the one or more additional game cycles;

detect a trigger event during the one or more additional game cycles; and shift the catalyst symbol from the first position to a second position on the symbol array in response to the trigger event by updating the stored state information to store a second position identifier corresponding to the second position.

14. The gaming system of claim 13, wherein the catalyst symbol appears only on a leftmost one and a rightmost one of the plurality of reels.

15. The gaming system of claim 13, wherein the second position is adjacent to the first position, and wherein the symbol array includes a plurality of columns and the second position is in a same one of the columns.

* * * * *